US011862392B2

(12) United States Patent
Seo

(10) Patent No.: US 11,862,392 B2
(45) Date of Patent: Jan. 2, 2024

(54) COIL ASSEMBLY FOR BREAKING VEHICLE AND BRAKE APPARATUS HAVING THE SAME

(71) Applicant: HYUNDAI MOBIS CO., LTD., Seoul (KR)

(72) Inventor: Eu Dong Seo, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 60 days.

(21) Appl. No.: 17/216,521

(22) Filed: Mar. 29, 2021

(65) Prior Publication Data

US 2022/0215995 A1    Jul. 7, 2022

(30) Foreign Application Priority Data

Jan. 4, 2021  (KR) .................. 10-2021-0000214

(51) Int. Cl.
| | | |
|---|---|---|
| H01F 7/08 | (2006.01) | |
| F16K 31/06 | (2006.01) | |
| H01F 7/126 | (2006.01) | |
| H01F 27/32 | (2006.01) | |
| B60T 13/68 | (2006.01) | |

(Continued)

(52) U.S. Cl.
CPC ............ H01F 7/081 (2013.01); B60T 13/686 (2013.01); B60T 15/028 (2013.01); F16K 31/0675 (2013.01); H01F 7/126 (2013.01); H01F 27/29 (2013.01); H01F 27/325 (2013.01)

(58) Field of Classification Search
CPC . H01F 5/0052; H01F 5/04; H01F 7/06; H01F 7/081; H01F 7/126; H01F 27/29; H01F 27/325; H01F 2007/062; H01F 2007/068; H01F 2007/083; F16K 31/0675;

(Continued)

(56) References Cited

U.S. PATENT DOCUMENTS

| | | | | |
|---|---|---|---|---|
| 4,446,889 A | * | 5/1984 | Sakakibara | ......... F16K 31/0682 335/270 |
| 6,362,717 B1 | | 3/2002 | Lewin | |

(Continued)

FOREIGN PATENT DOCUMENTS

| | | |
|---|---|---|
| CN | 102460836 | 5/2012 |
| CN | 103158688 | 6/2013 |

(Continued)

OTHER PUBLICATIONS

Notification of reasons for refusal on Chinese Patent Application No. 2021-10616648 (with English Translation).

*Primary Examiner* — Matthew W Jellett

(74) *Attorney, Agent, or Firm* — H.C. Park & Associates, PLC

(57) ABSTRACT

A coil assembly for vehicle braking includes a hollow bobbin configured to allow a coil to be wound along an outer circumferential surface thereof, and having at least one engagement protrusion formed on an upper surface and/or a lower surface, a plurality of lead pins coupled with the bobbin to supply current to the coil, a plurality of pin assembly units formed on two side ends of the bobbin to fix the lead pins and connect the lead pins to the coil and a hollow case configured to surround at least a portion of the bobbin, and formed to be bent in the upper and lower portions in a first direction to be attached to the upper and lower surfaces of the bobbin.

11 Claims, 7 Drawing Sheets

(51) Int. Cl.
  *B60T 15/02* (2006.01)
  *H01F 27/29* (2006.01)
(58) Field of Classification Search
  CPC .......... B60T 8/363; B60T 8/366; B60T 8/686;
  B60T 15/028
  See application file for complete search history.

(56) References Cited

U.S. PATENT DOCUMENTS

| | | | |
|---|---|---|---|
| 6,633,216 B2* | 10/2003 | Lewin | H01F 7/126 335/278 |
| 6,731,192 B1* | 5/2004 | Moreno | H01F 5/04 335/220 |
| 6,985,060 B2* | 1/2006 | Parker | B60T 8/363 335/282 |
| 7,458,557 B2* | 12/2008 | Tsujimura | H01F 7/1607 335/299 |
| 7,513,482 B2* | 4/2009 | Shibata | B60T 8/363 303/119.2 |
| 8,123,193 B2* | 2/2012 | Kratzer | F16K 31/0658 137/15.17 |
| 9,267,610 B2* | 2/2016 | Ogawa | F16K 31/046 |
| 11,167,740 B2* | 11/2021 | Komaba | B60T 15/028 |
| 2004/0239178 A1* | 12/2004 | Otsuka | H01F 7/081 251/129.09 |
| 2007/0051839 A1 | 3/2007 | Tsujimura et al. | |
| 2010/0252764 A1 | 10/2010 | Schalowski et al. | |
| 2012/0080626 A1 | 4/2012 | Fuerst | |
| 2013/0153799 A1 | 6/2013 | Ogawa et al. | |

FOREIGN PATENT DOCUMENTS

| | | |
|---|---|---|
| DE | 102013225803 | 1/2015 |
| KR | 1020080088264 | 10/2008 |
| KR | 1020100034650 | 4/2010 |
| KR | 1020150061318 | 6/2015 |
| KR | 1020160041637 | 4/2016 |

* cited by examiner

COIL ASSEMBLY FOR BREAKING VEHICLE AND BRAKE APPARATUS HAVING THE SAME

CROSS-REFERENCE TO RELATED APPLICATION

This application claims priority from and the benefit of Korean Patent Application No. 10-2021-0000214, filed on Jan. 4, 2021, which is hereby incorporated by reference for all purposes as if set forth herein.

TECHNICAL FIELD

Field

Exemplary embodiments relate to a coil assembly for vehicle braking and a brake apparatus having the same. More particularly, the present disclosure relates to a coil assembly for vehicle braking and a brake apparatus having the same for use in vehicle ABS (Anti-lock Brake System) and similar systems.

Discussion of the Background

The statements in this section merely provide background information related to the present disclosure and do not necessarily constitute prior art.

If a vehicle is braked only by a driver's manual operation when a vehicle slip occurs, the driver may apply the brake pedal and at the same time hold the steering wheel to prevent the wheels from rotating. However, such manual braking cannot usually achieve an optimal braking reflecting a driving condition of the vehicle and the road surface conditions, and therefore, the risk of an accident rises.

Accordingly, various technologies and methods for automatically controlling braking pressure have been adopted to overcome such limitations of a simple manual braking and to improve vehicle stability when braking a vehicle. For example, an ABS (Anti-lock Brake System) is configured to prevent the vehicle from slipping by automatically and quickly adjusting the braking pressure applied to the wheels according to the slip ratio calculated from the driving state of the vehicle.

The above information disclosed in this Background section is only for enhancement of understanding of the background of the invention and, therefore, it may contain information that does not constitute prior art.

SUMMARY

According to at least one embodiment, the exemplary embodiments of the present disclosure provides a coil assembly for vehicle braking, including a hollow type bobbin configured to allow a coil to be wound along an outer circumferential surface thereof, and having at least one engagement protrusion formed on an upper surface and/or a lower surface; a plurality of lead pins coupled with the bobbin to supply current to the coil; a plurality of pin assembly units formed on both side ends of the bobbin to fix the lead pins and connect the lead pins to the coil; and a hollow type case configured to surround at least a portion of the bobbin, and formed to be bent in the upper and lower portions in a first direction to thereby be attached to the upper and lower surfaces of the bobbin, and including at least one engagement hole to be engaged with the engagement protrusion and a step difference formed on both sides to narrow the width of the surface to be engaged with the engagement protrusion.

According to another embodiment, the present disclosure provides a brake apparatus, including a coil assembly for vehicle braking including a hollow type bobbin configured to allow a coil to be wound along an outer circumferential surface thereof, and having at least one engagement protrusion formed on an upper surface and/or a lower surface; a plurality of lead pins coupled with the bobbin to supply current to the coil; a plurality of pin assembly units formed on both side ends of the bobbin to fix the lead pins and connect the lead pins to the coil; and a hollow type case configured to surround at least a portion of the bobbin, and formed to be bent in the upper and lower portions in a first direction to thereby be attached to the upper and lower surfaces of the bobbin, and including at least one engagement hole to be engaged with the engagement protrusion and a step difference formed on both sides to narrow the width of the surface to be engaged with the engagement protrusion; a first housing including a printed circuit board that may be coupled with the lead pins by use of press-fitting or soldering, and configured to accommodate the coil assembly for vehicle braking; and a second housing includes a valve assembly accommodated in the bobbin and configured to control the opening and closing of an oil flow path, and is coupled with the first housing so that the outer surface may contact the case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
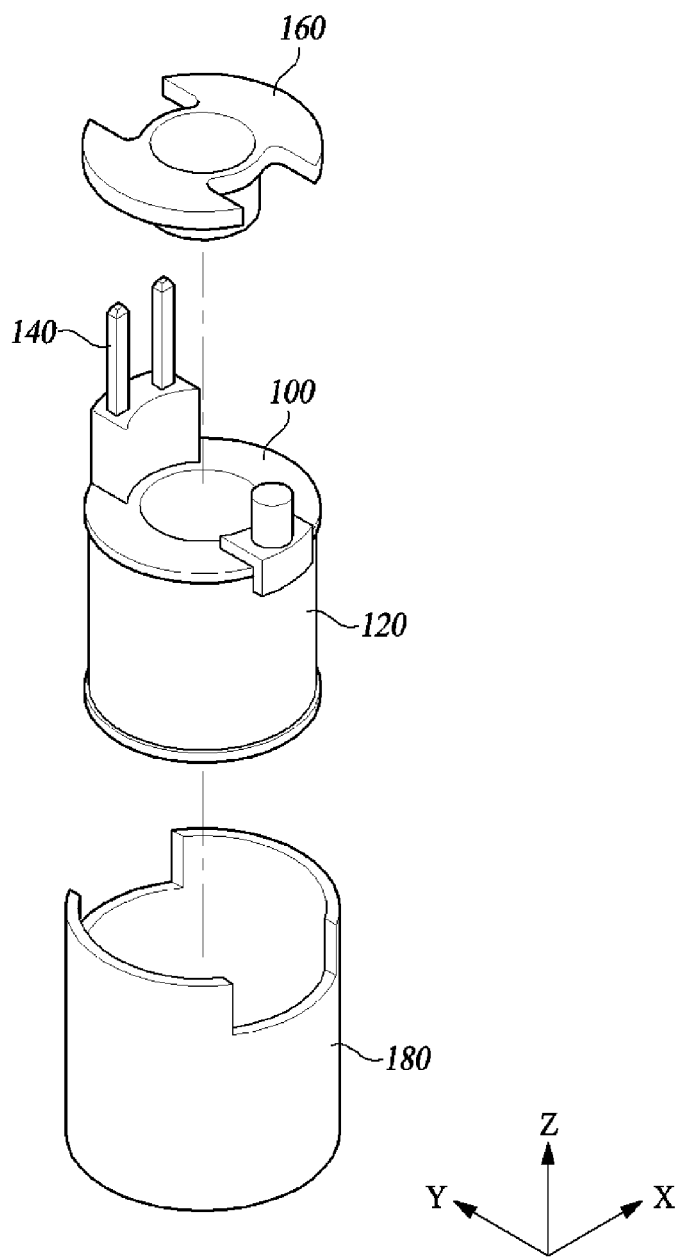
FIG. 1 is an exploded perspective view illustrating a coil assembly for vehicle braking.

The invention is described more fully hereinafter with reference to the accompanying drawings, in which embodiments of the invention are illustrated. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

At least one embodiment of the present disclosure seeks to address the above issues and to provide a coil assembly for vehicle braking and a brake apparatus having the same that reduces the overall manufacturing process costs while the coil assembly for vehicle braking has a 3-axis degree of freedom.

Some exemplary embodiments of the present disclosure are described below with reference to the accompanying drawings. In the following description, like reference numerals preferably designate like elements, although the elements are illustrated in different drawings. Further, in the following description of some embodiments, a detailed description of known functions and configurations incorporated herein will be omitted for the purpose of clarity and for brevity.

Additionally, alphanumeric code such as first, second, i), ii), (a), (b), etc., in numbering components are used solely for the purpose of differentiating one component from the other but not to imply or suggest the substances, the order or sequence of the components. Throughout this specification, when a part "includes" or "comprises" a component, the part is meant to further include other components, not excluding thereof unless there is an explicit description contrary thereto.

Terms such as "upper," "lower," "top," "bottom," "side," and so forth may be used for identification of certain sides of a given figure but are not meant to be limiting in that the device or apparatus must always be positioned in a given direction. For example, what is labeled "upper" in one figured may be a "lower" portion or a "side" portion in another figure or in use of the actual device of the device or apparatus.

In addition, control of a braking pressure may be achieved by installing various solenoid valves on a hydraulic circuit formed between a wheel cylinder that holds and restrains a disk wheel and a master cylinder that generates hydraulic pressure. Herein, the control of the solenoid valves is performed by an ECU (Electronic Control Unit), and the braking pressure can be adjusted by performing control of the opening and closing of the solenoid valves by the ECU. The solenoid valves generally consist of a coil assembly and a valve assembly combined.

FIG. 1 is an exploded perspective view of a coil assembly for vehicle braking.

Figure 2:
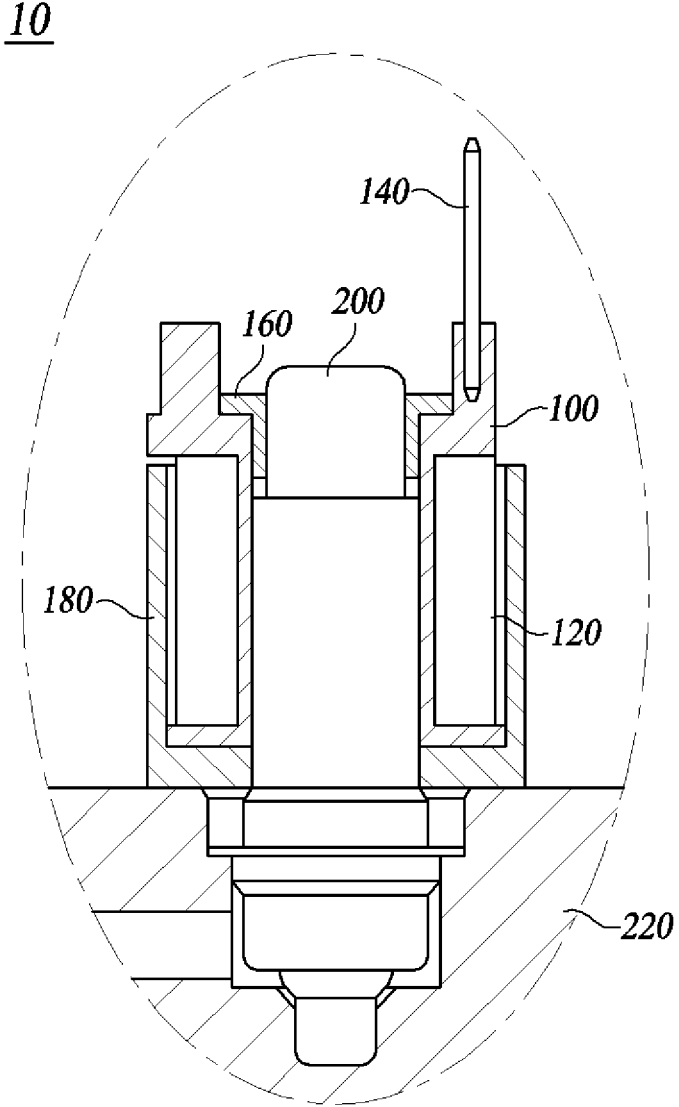
FIG. 2 is a cross-sectional view illustrating a braking device including a coil assembly for vehicle braking taken along the Y axis.

FIG. 2 is a cross-sectional view of a braking device including a coil assembly for vehicle braking taken along the Y axis.

Referring to FIG. 1, a coil assembly for vehicle braking 10 includes a bobbin 100, a plurality of lead pins 140, an upper case 160, and a lower case 180.

A coil 120 is wound around the bobbin 100 to produce an electromagnetic field when current is applied to the coil 120, and the lead pins 140 are for supplying current to the coil 120. The upper case 160 and the lower case 180 protect the bobbin 100, release heat generated from the coil 120, and transmit an electromagnetic field produced in the coil to the valve assembly (200 in FIG. 2).

Referring to FIG. 2, a braking device including a coil assembly for vehicle braking 10 includes a valve assembly 200 capable of opening and closing an internal flow path by using an electromagnetic field produced in the coil 120 and a pump housing 220 which may contact the lower case 180.

Because current flows through the coil 120, it is desired to dissipate heat generated from the coil 120. Therefore, it is desirable to have a degree of freedom in the Z-axis direction so that the lower case 180 surrounding the outer circumferential surface of the coil 120 can be in close contact with the outer surface of the pump housing 220.

In addition, when the pump housing 220 and the ECU housing (not illustrated) are assembled, the height of the coil 120 may become different from that of a normal case due to variations between products. Because such a height tolerance of the coil 120 is the main cause of an ECU performance deviation and noise, it is desirable to minimize the tolerance. When the coil assembly for vehicle braking 10 has a degree of freedom in the Z-axis direction, the above tolerance can be compensated.

Meanwhile, in order to prevent interference caused by assembling the coil assembly for vehicle braking 10 and the valve assembly 200, it is desirable that the coil assembly for vehicle braking 10 be configured to have degrees of freedom in the X and Y axes.

However, in case that the outer circumferential surface of the coil 120 is surrounded by the lower case 180 as with the coil assembly for vehicle braking 10, this structure should be manufactured by using a deep drawing method. This increases the material cost and process cost for manufacturing the coil assembly for vehicle braking 10. Therefore, it is desired to configure the coil assembly to have X-axis, Y-axis and Z-axis degrees of freedom without using such a deep drawing method.

Figure 3:
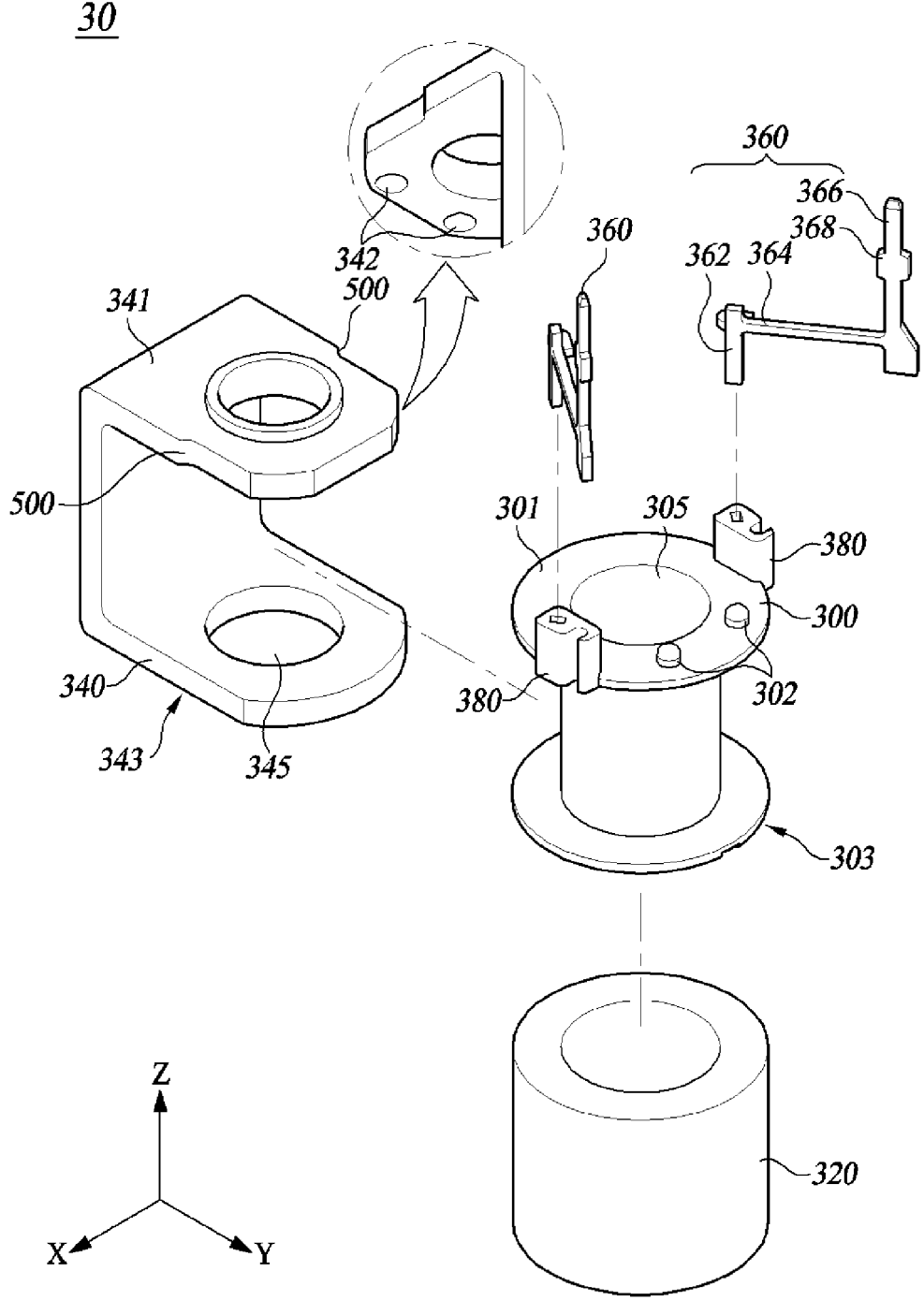
FIG. 3 is an exploded perspective view illustrating a coil assembly for vehicle braking according to an embodiment of the present disclosure.

FIG. 3 is an exploded perspective view illustrating a coil assembly for vehicle braking according to an embodiment of the present disclosure.

Figure 4:
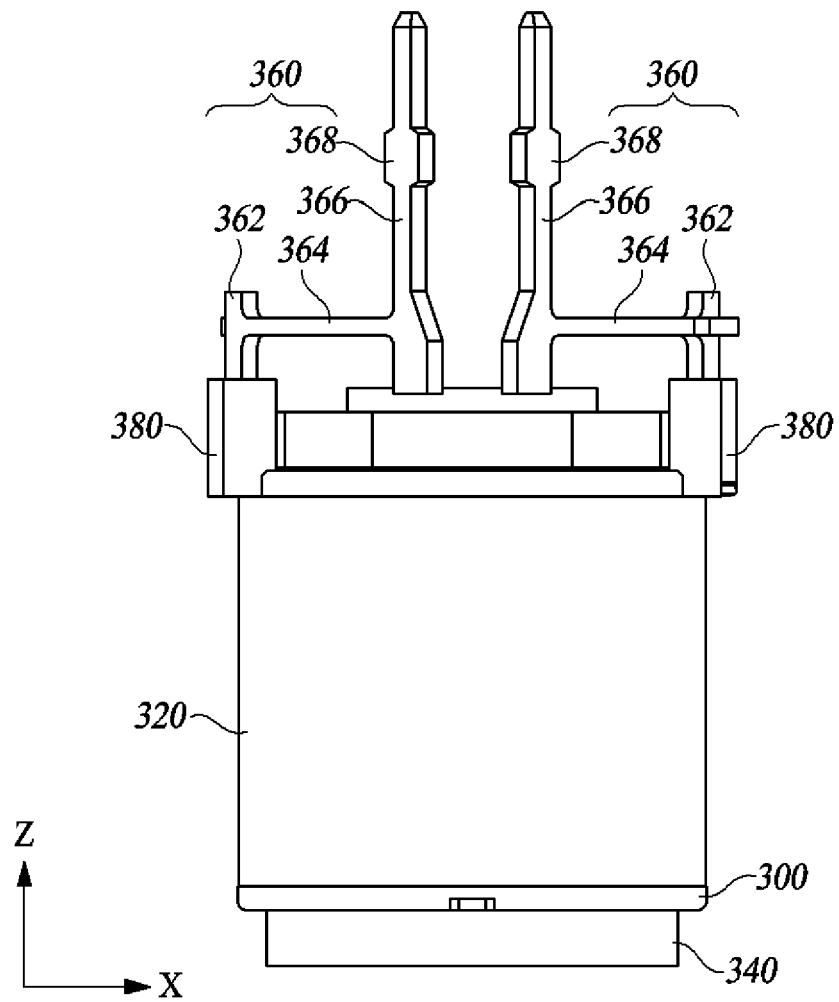
FIG. 4 is a front view illustrating a coil assembly for vehicle braking according to an embodiment of the present disclosure.

FIG. 4 is a front view illustrating a coil assembly for vehicle braking according to an embodiment of the present disclosure.

Figure 5:
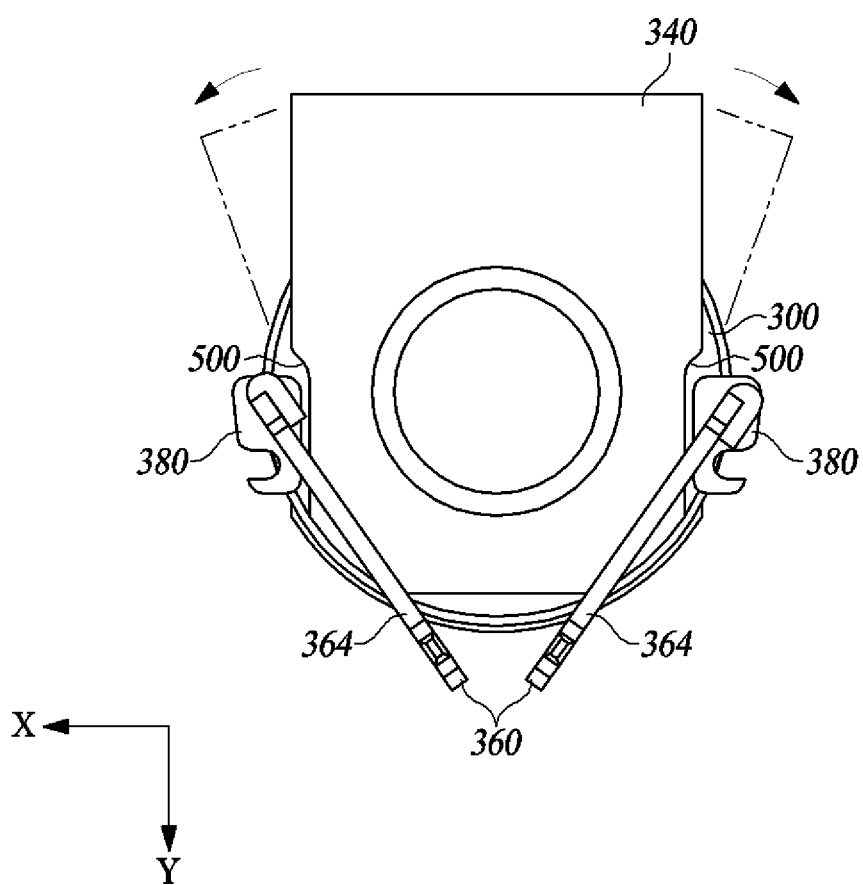
FIG. 5 is a plane view illustrating a coil assembly for vehicle braking according to an embodiment of the present disclosure.

FIG. 5 is a plane view illustrating a coil assembly for vehicle braking according to an embodiment of the present disclosure.

Figure 6:
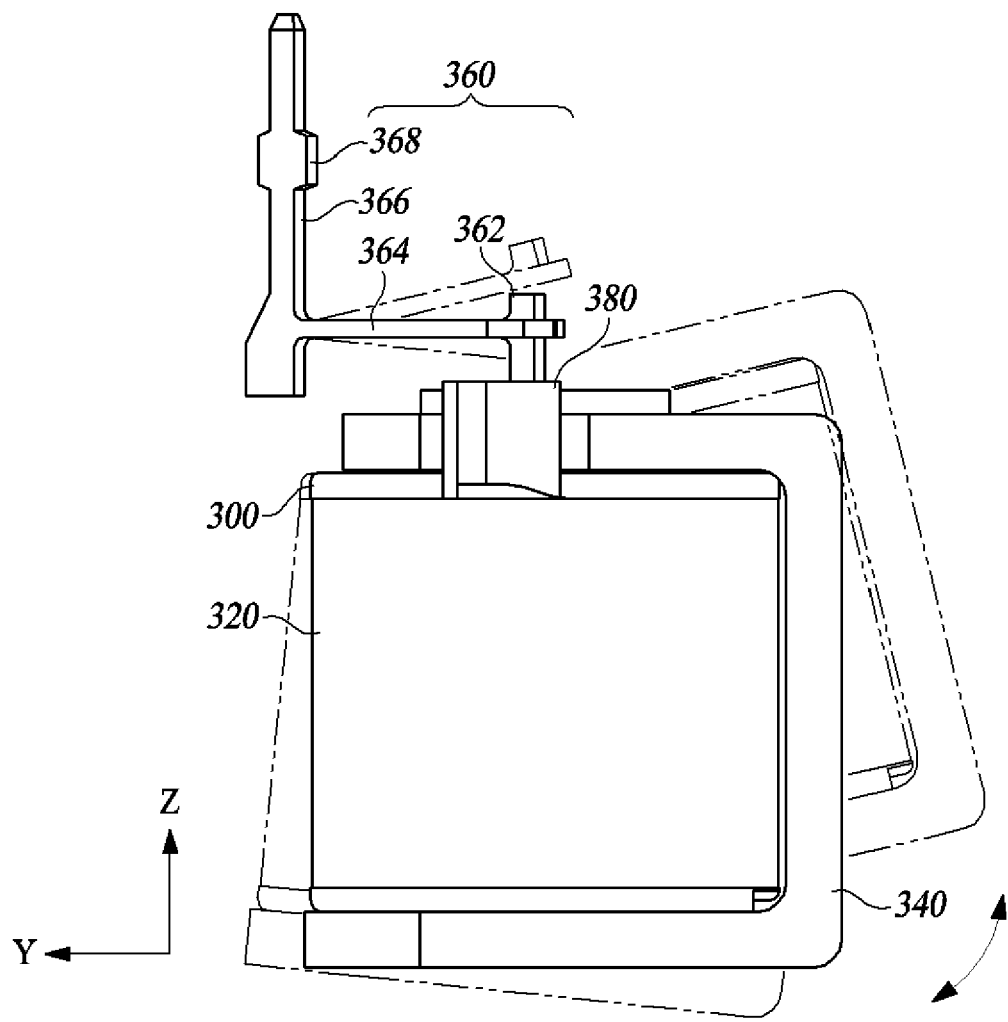
FIG. 6 is a side view illustrating a coil assembly for vehicle braking according to an embodiment of the present disclosure.

FIG. 6 is a side view illustrating a coil assembly for vehicle braking according to an embodiment of the present disclosure.

Referring to FIGS. 3 to 6, the coil assembly 30 for vehicle braking according to at least one embodiment of the present disclosure includes all or part of a bobbin 300, a case 340, a plurality of lead pins 360 and a pin assembly unit 380.

The bobbin 300 is configured to allow a coil 320 to be wound along its outer circumferential surface. Because the bobbin 300 is of a hollow type, a bobbin central hole 305 is formed in a center of the bobbin. A valve assembly (not illustrated) may be assembled in the bobbin central hole 305, and the valve assembly is configured to control the opening and closing of an oil flow path by using a magnetic field generated by a current flowing through the coil 320.

The bobbin 300 may be injection-molded using a plastic material, and at least one engagement protrusion 302 may be formed on an upper surface 301 and/or a lower surface 303 of the bobbin 300. In FIG. 3, it is illustrated that two engagement protrusions 302 are formed on the upper surface 301 of the bobbin 300. The at least one engagement protrusion 302, however, is not limited to the example configuration illustrated in FIG. 3. Specifically, the at least one engagement protrusion 302 may also be formed on the lower surface 303 of the bobbin 300, and the number of engagement protrusions 302 is not limited to two.

The case 340 is configured to surround at least a portion of the bobbin 300. The case 340 is formed to be bent in an upper portion 341 and a lower portion 343 thereof in a first direction to thereby be attached to the upper surface 301 and lower surface 303 of the bobbin 300. Here, the first direction may mean, for example, the Y-axis direction in FIG. 3. Accordingly, as illustrated in FIG. 6, when viewed from the side, the case 340 may have a "C" shape. However, the direction in which the upper portion 341 and lower portion 343 of the case 340 are bent is not necessarily the Y-axis direction in FIG. 3, and the bending direction may be changed depending on the position of the at least one coupling protrusion 302 and the position of the pin assembly unit 380 to be described later.

Meanwhile, the valve assembly is assembled in the bobbin central hole 305 and configured to control the opening and closing of an oil flow path. Therefore the case central hole 345 may be formed at a position corresponding to the bobbin central hole 305 on the bent surface of the case 340. Herein, it is desirable that the center of the case central hole 345 and that of the bobbin central hole 305 coincide with each other.

The case 340 may include at least one engagement hole 342 to engage with the at least one engagement protrusion 302. Here, the at least one engagement hole 342 may include one or multiple, and is desirably formed to correspond to the number and position of the at least one engagement protrusions 302.

As the at least one engagement protrusion 302 and the at least one engagement hole 342 are engaged, the case 340 is attached to the upper surface 301 and the lower surface 303 of the bobbin 300 and may be firmly engaged without an additional fixing component. As the case 340 is attached to and engaged to the bobbin 300, heat generated from the coil 320 can be dissipated via the case 340.

In the manufacturing of a previous case, the case has a cylindrical shape in order to correspond to the shape of the bobbin 300, and therefore a deep drawing method should be applied. In such a case, even after the application of the deep drawing method, additional processes such as a cleaning process for removing drawing oil and a zinc plating for improving erosion resistance are required, and therefore the overall process cost increases.

However, in the coil assembly 30 according to an embodiment of the present disclosure, the case 340 surrounding the bobbin 300 need not be configured in a cylindrical shape that corresponds to the shape of the bobbin 300. Therefore, there is no need to use a deep drawing method when manufacturing the case 340, and it may be manufactured by using, for example, a pre-plated steel plate, thereby reducing the overall process cost.

The lead pins 360 are coupled with the bobbin 300 to supply current to the coil 320. The lead pins 360 may be include a plurality, for example, two. One end of the lead pins 360 may be connected to a printed circuit board (not illustrated), and the other end of the lead pins 360 may be connected to the coil 320. In addition, for the sake of structural stability, it is desirable that the lead pins 360 are configured to be symmetrical to each other with respect to the first direction that passes along the center of the bobbin 300.

An upper surface 301 or a bottom surface 303 of the bobbin 300 may have multiple side ends on which to mount the pin assembly units 380. The pin assembly units 380 may be formed at two side ends of the bobbin 300 and are configured to fix the lead pins 360 and connect the lead pins 360 to the coil 320. The pin assembly units 380 may be configured in the plural, and the number of the pin assembly units 380 is preferably the same as the number of the lead pins 360. In this case, the lead pins 360 may be fixed to the pin assembly units 380 and may be connected to the bobbin 300 and coil 320 by using the pin assembly units 380.

In addition, in order to fix the lead pins 360, the pin assembly units 380 are configured to be engaged with the lead pins 360 by inserting the lead pins 360 into the pin assembly units 380.

Meanwhile, when the lead pins 360 are configured to be symmetrical to each other with respect to the first direction that passes along the center of the bobbin 300, it is desirable that the pin assembly units 380 are also configured to be symmetrical to each other with respect to the first direction that passes along the center of the bobbin 300. Herewith, when the pin assembly units 380 are formed on both side ends of the bobbin 300, an interference may occur between the case 340 and the pin assembly units 380 in a process in which the bobbin 300 and the case 340 are engaged.

Referring to FIG. 5, for avoidance of the above interference, the case 340 may include a step difference 500 formed on both sides of the case 340 to narrow the width of the upper portion 341 or lower portion 343 to be engaged with the engagement protrusion 302. Due to the step difference 500 in the case 340, a sufficient space can be secured for the pin assembly units 380. In addition, interference between the case 340 and the pin assembly units 380 may be prevented while the bobbin 300 and the case 340 are combined.

Meanwhile, each of the lead pins 360 may include a fixing portion 366, an elastic portion 364, and a coil connecting portion 362.

The fixing portion 366 is formed to be elongated in a second direction and configured to be coupled with the printed circuit board. Here, the second direction refers to the Z-axis direction in FIG. 3. The second direction is a height direction of the bobbin 300, and the first direction and the second direction are perpendicular to each other. However, the second direction need not be configured in a direction perpendicular to the first direction.

The fixing portion 366 includes a protruding portion 368 protruding from the fixing portion 366. This is configured to prevent the fixing portion 366 from being separated from the printed circuit board if the fixing portion 366 is press-fitted or soldered to the printed circuit board. Meanwhile, referring to FIGS. 3 to 6, the protruding portion 368 is illustrated to be formed at a point corresponding to approximately a middle of the fixing portion 366. As long as the protruding portion 368 protrudes from the fixing portion 366, however, the position of the protruding portion 368 is not limited thereto.

The elastic portion 364 is formed to extend in a direction perpendicular to the second direction from the fixing portion 366. The elastic portion 364 may be configured to be elastically deformable by an external force.

Referring to FIGS. 3 to 6, the coil assembly 30 is configured to be movable according to the deformation direction of the elastic portion 364. For example, when a force is applied in the −Z axis direction to the elastic portion 364, the elastic portion 364 is deformed in the −Z axis direction, so that the coil assembly 30 can accordingly move in the −Z axis direction.

Therefore, in the process of assembling a pump housing (not illustrated) and an ECU (Electronic Control Unit) housing (not illustrated), a problematic occurrence of the height tolerance of the coil 320 may be prevented. In addition, it becomes easier to dissipate heat generated from the coil 320 because the case 340 is in close contact with the pump housing.

In addition, referring to FIGS. 5 and 6, the elastic portion 364 is configured to be deformable in the second direction as well as the first direction, for example the Y-axis direction when the second direction is the height direction of the bobbin 300, that is, the Z-axis direction. Further, the elastic portion 364 can also be deformed in a third direction perpendicular to the first and second directions, for example, the X-axis direction. When a force in the X-axis and/or Y-axis direction is applied to the elastic portion 364, the elastic portion 364 is deformed in the X-axis and/or Y-axis direction, so that the coil assembly 30 can be moved in the X-axis and/or Y-axis direction.

Therefore, the above configuration helps prevent an interference between the valve assembly and the bobbin 300 when assembling the valve assembly in the bobbin central hole 305.

The coil connecting portion 362 extends in the second direction from the elastic portion 364 and is configured to be coupled with the pin assembly units 380. The coil connecting portions 362 are coupled with the pin assembly units 380 by inserting the coil connecting portion 362 into the pin assembly units 380, and are connected to the coil 320 passing through the pin assembly units 380.

For example, the coil 320 may be connected to the coil connecting portion 362 while being wound around the coil connecting portion 362. In order to fix the coil 320 to the coil connecting portion 362, the coil 320 may be bonded with the coil connecting portion 362 by using a resistance welding. However, the bonding method of the coil 320 is not necessarily limited to the resistance welding, and, for example, a soldering method may be used.

According to an embodiment of the present disclosure, the lead pins 360 include the above configuration, and the elastic portion 364 is deformable in the X-axis, Y-axis, and Z-axis, so that a 3-axis degree of the freedom of the coil assembly 30 for vehicle braking can be secured.

In order to expand a movable range of the coil assembly 30, it is desirable that the length of the elastic portion 364 is sufficiently secured. Therefore, the pin assembly units 380 may be formed at both side ends of the bobbin 300 and configured to be symmetrical to each other with respect to the first direction that passes along the center of the bobbin 300. Further, the elastic portion 364 may be configured to extend in a diagonal direction with respect to the first direction from the fixing portion 366 as illustrated in FIG. 5.

Because the pin assembly units 380 and the elastic portion 364 are configured as described above, the length of the elastic portion 364 may be sufficiently secured. Specifically, it is desirable that the pin assembly units 380 are formed on both side ends of the bobbin 300 and the elastic portion 364 is configured to extend in the diagonal direction with respect to the first direction in order to secure structural stability and a sufficient length of the elastic portion 364, in a state that the coupling position of the fixing portion 366 and the printed circuit board is determined.

Figure 7:
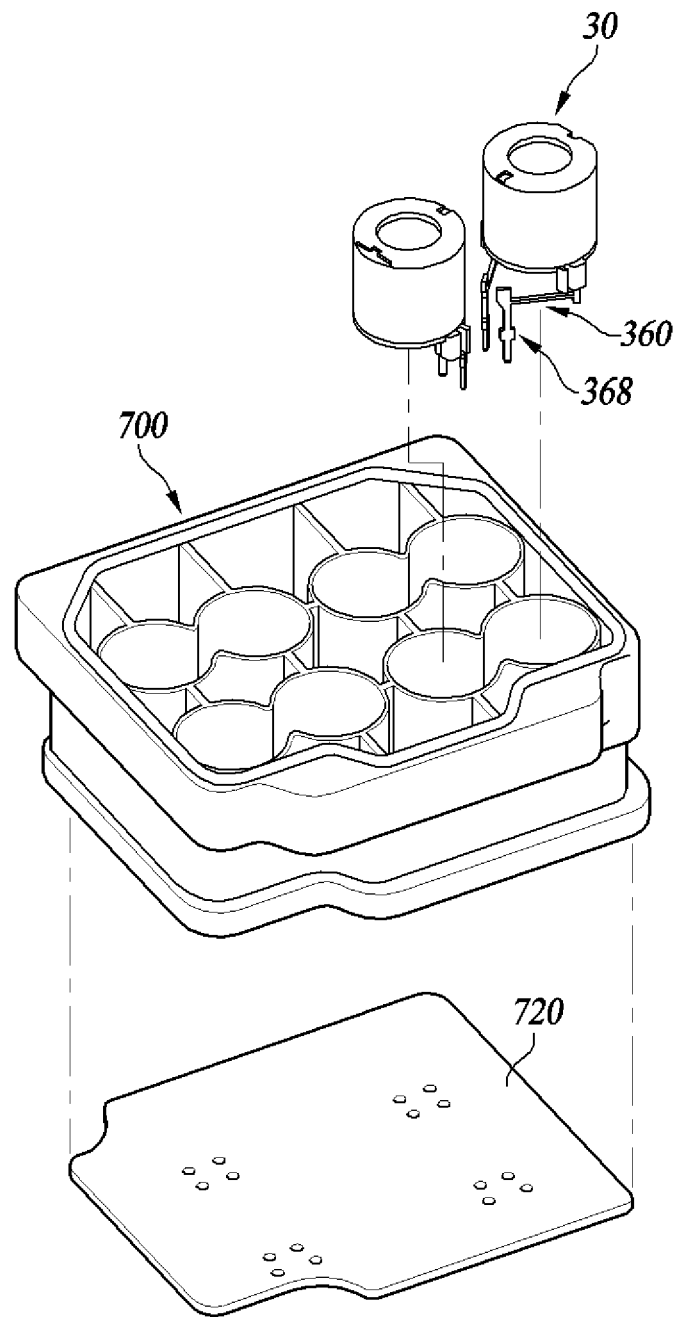
FIG. 7 is an exploded perspective view illustrating a housing for a coil assembly for vehicle braking according to an embodiment of the present disclosure.

Meanwhile, referring to FIG. 7, according to an embodiment of the present disclosure, the braking apparatus may include the coil assembly 30, a first housing 700 and a second housing (not illustrated).

The description of the coil assembly 30 is the same as described above, and therefore it will be omitted hereinafter.

The first housing 700 includes the printed circuit board 720 that can be coupled with the lead pins 360 by use of press-fitting or soldering, and is configured to accommodate the coil assembly 30 therein. In FIG. 7, it is shown that the coil assembly 30 does not include the case 340, however, the coil assembly 30 may include the case 340. In this case, the shape of the portion of the first housing 700 accommodating the coil assembly 30 can be changed.

Each of the lead pins 360 may include the protruding portion 368 protruding from each of the lead pins 360. Each of the lead pins 360 may be coupled with the first housing 700 using the protruding portion 368. Because the protruding portion 368 is coupled with the first housing, the lead pins 360 cannot be easily separated from the printed circuit board 720. A detailed description of the protruding portion 368 has been described above, and therefore it will be omitted hereinafter.

The second housing includes the valve assembly accommodated in the bobbin 300 and configured to control the opening and closing of the oil flow path. The second housing is coupled with the first housing so that the outer surface may contact the case 340.

The braking apparatus including the above configuration is configured to automatically and electronically control the opening and closing of the oil flow path, and therefore an anti-lock brake system (ABS) of the vehicle becomes implementable. In addition, because there is no need to apply the deep drawing method when manufacturing the coil assembly 30, manufacturing process costs may be reduced compared to that of previous braking apparatuses.

As described above, according to the exemplary embodiment of the present disclosure, the coil assembly 30 for vehicle braking has a three-axis degree of freedom while reducing the overall manufacturing process cost.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A coil assembly for vehicle braking, comprising:
   a hollow bobbin configured to allow a coil to be wound between upper and lower surfaces thereof along an outer circumferential surface thereof, and having at least one engagement protrusion formed on an upper surface and/or a lower surface thereof;
   a plurality of lead pins coupled with the hollow bobbin to supply current to the coil;
   a plurality of pin assembly units formed on two side ends of the hollow bobbin to fix the plurality of lead pins and connect the plurality of lead pins to the coil; and
   a hollow case configured to surround at least a portion of the hollow bobbin and having upper and lower portions each having two opposed sides and an end extending between the opposed sides, the upper and lower portions being bent in a first direction to thereby and be attached to the upper and lower surfaces of the hollow bobbin, one of the upper and lower portions having a first width in a second direction perpendicular to the first direction and including at least one engagement hole to be engaged with the at least one engagement protrusion and a plurality of step differences formed on the two opposing sides of the one portion to define a second width narrow than the first width in the second direction, wherein the plurality of pin assembly units are received within the step differences, and wherein a center of the hollow bobbin is located on a line passing through points where each of the plurality of lead pins is fixed to each of the plurality of pin assembly units.

2. The coil assembly for vehicle braking of claim 1, wherein each of the plurality of lead pins include:
 a fixing portion formed to be elongated in a second direction and configured to be coupled with a printed circuit board;
 an elastic portion formed to extend in a direction perpendicular to the second direction from the fixing portion and configured to be elastically deformable by an external force; and
 a coil connecting portion formed to extend in the second direction from the elastic portion and configured to be coupled with the plurality of pin assembly units.

3. The coil assembly for vehicle braking of claim 2, wherein the first direction and the second direction are perpendicular to each other, and the second direction is in a height direction of the hollow bobbin.

4. The coil assembly for vehicle braking of claim 3, wherein the elastic portion is deformable in the first direction, the second direction, and in a third direction perpendicular to the first and second directions.

5. The coil assembly for vehicle braking of claim 2, wherein the elastic portion is configured to extend in a diagonal direction with respect to the first direction from the fixing portion.

6. The coil assembly for vehicle braking of claim 2, wherein the coil is bonded with the coil connecting portion while being wound around the coil connecting portion by using a resistance welding or a soldering.

7. The coil assembly for vehicle braking of claim 1, wherein the plurality of pin assembly units are configured to be symmetrical to each other with respect to the first direction that passes along a center of the hollow bobbin.

8. The coil assembly for vehicle braking of claim 7, wherein the plurality of lead pins are configured to be symmetrical to each other with respect to the first direction that passes along the center of the hollow bobbin.

9. The coil assembly for vehicle braking of claim 1, wherein the plurality of pin assembly units are configured to be engaged with the plurality of lead pins by inserting the plurality of lead pins into the plurality of pin assembly units.

10. A brake apparatus, comprising;
 a coil assembly for vehicle braking including a hollow bobbin configured to allow a coil to be wound between upper and lower surfaces thereof along an outer circumferential surface thereof, and having at least one engagement protrusion formed on an upper surface and/or a lower surface;
 a plurality of lead pins coupled with the hollow bobbin to supply current to the coil;
 a plurality of pin assembly units formed on two side ends of the hollow bobbin to fix the plurality of lead pins and connect the plurality of lead pins to the coil;
 a hollow case configured to surround at least a portion of the hollow bobbin, and having upper and lower portions each having two opposed sides and an end extending between the opposed sides, the upper and lower portions being bent in a first direction to thereby and be attached to the upper and lower surfaces of the hollow bobbin, one of the upper and lower portions having a first width in a second direction perpendicular to the first direction and including at least one engagement hole to be engaged with the at least one engagement protrusion and a plurality of step differences formed on the two opposing sides of the one portion to define a second width narrow than the first width in the second direction;
 a first housing including a printed circuit board coupled with the lead pins by use of press-fitting or soldering, and configured to accommodate the coil assembly for vehicle braking; and
 a second housing including a valve assembly accommodated in the bobbin and configured to control the opening and closing of an oil flow path, and coupled with the first housing so that the outer surface may contact the hollow case,
 wherein the plurality of pin assembly units are received within the step differences, and
 wherein a center of the hollow bobbin is located on a line passing through points where each of the plurality of lead pins is fixed to each of the plurality of pin assembly units.

11. The brake apparatus of claim 10, wherein each of the plurality of lead pins comprise:
 a protruding portions protruding from each of the plurality of lead pins,
 wherein each of the plurality of lead pins is coupled with the first housing using the protruding portion.

* * * * *